United States Patent [19]

Medan et al.

[11] Patent Number: 5,530,950
[45] Date of Patent: Jun. 25, 1996

[54] AUDIO DATA PROCESSING

[75] Inventors: Yoav Medan, Haifa; Michael Rodeh, Oshrat, both of Israel; Ronald J. Bowater, Romsey, United Kingdom

[73] Assignee: International Business Machines Corporation, Armonk, N.Y.

[21] Appl. No.: 247,166

[22] Filed: May 20, 1994

[30] Foreign Application Priority Data

Jul. 10, 1993 [GB] United Kingdom ............... 9314296

[51] Int. Cl.⁶ .................................................. H04M 1/64
[52] U.S. Cl. .................... 379/67; 379/71; 379/97
[58] Field of Search ............................ 379/67, 88, 89, 379/97, 71, 75; 369/25, 29; 364/419.03, 419.07

[56] References Cited

U.S. PATENT DOCUMENTS 4,845,739  7/1989  Katz ........................................ 379/67
5,052,038  9/1991  Shepard .................................. 379/97
5,265,075  11/1993  Bergeron et al. ..................... 379/75

Primary Examiner—Jeffery Hofsass
Assistant Examiner—Fan Tsang
Attorney, Agent, or Firm—Joscelyn G. Cockburn

[57] ABSTRACT

Audio data processing apparatus connectable to a telephone network, the apparatus comprising a device (50) to receive from the network and record an audio signal comprising a sequence of audio segments separated by audio delimiters, characterised by a device (90) for scanning the recorded signal (65) to detect the audio delimiters (80) and generate a data structure in which a set of predefined field identifiers are each linked to a corresponding one of the recorded audio segments.

10 Claims, 4 Drawing Sheets

AUDIO DATA PROCESSING

The invention relates to audio data processing apparatus connectable to a telephone network and methods of operating such apparatus.

BACKGROUND OF THE INVENTION

1. Field of the Invention

In today's business environment the telephone is often the primary means of communication in many different situations: for example placing catalogue orders, checking airline schedules, querying prices, reviewing account balances, and recording and retrieving messages. Conventionally, each telephone call involves a service representative talking to a caller, asking questions, entering responses into a computer and reading information to a caller from a computer screen.

It is known to automate this process by substituting audio data processing apparatus for the operator. Such apparatus answers the incoming call, receives information from, and provides information to, the caller. This has the advantages of reducing costs, providing better customer service, increasing the services available and extending the hours of operation.

However, in many current audio data processing systems the human-machine interaction is lengthy and cumbersome due to the fact that the voice messages delivered by the apparatus generally have to be delivered in sequence and contain multiple choice menus that have to be announced before each required user selection.

One way of shortening the human-machine interaction is to allow non-coded audio information to be entered which is subsequently transcribed. Some current commercial systems use conventional answering machines or similar devices to collect input in this way. Such schemes have the disadvantages that only sequential access is offered to the recorded signals, so, for example, there is no practical way to prioritize the handling of incoming messages according to urgency. Furthermore, the cost of audio transcription is very high, both in terms of manpower if carried out manually or in terms of computer resources if carried out using automatic speech recognition.

SUMMARY OF THE INVENTION

The present invention enables audio data processing apparatus to be provided which is connectable to a telephone network, the apparatus comprising means to receive from the network and record an audio signal comprising a sequence of audio segments separated by audio delimiters, characterised by means for scanning the recorded signal to detect the audio delimiters and generate a data structure in which a set of predefined field identifiers are each linked to a corresponding one of the recorded audio segments.

The audio segments can be voice segments or can be single or multiple DTMF tones entered by time caller. The audio delimiters can be DTMF tones, features of the incoming speech, for instance a short period of silence, or any other audio features introduced into the audio signal either by the user or by the recording means and which are recognisable by the scanning means.

The use of audio delimiters enables parts of the recorded audio signal to be accessed non-sequentially. This has great advantages in expediting the off-line processing of especially the non-coded audio information because parts of the signal can be selectively processed, for example to establish a priority level or to enable use of automatic speech recognition for fields which are known to be of a particular type using a limited expected vocabulary, as for instance if the input was known to be a number between one and ten or either yes or no.

Since not all of the recorded signal needs to be processed in real time, the full power of available voice recognition technology may be used to provide speaker-independent continuous recognition of parts of the signal as required using any vocabulary or language.

The separation of the recording mechanism from the processing of the recorded signal provides flexibility because the recording mechanism needed not know anything about the structure of the information it is recording. Thus the order or the language in which information is entered can be made irrelevant. The recorded signal can be considered to be a filled-in form with the individual fields of the form separated by the audio delimiters. The form layout is defined by the set of predefined field identifiers.

Where the audio delimiters are features of an input speech sequence, such as a deliberate period of silence, a separate criterion such as the order in which the audio segments are input can be used to ensure that the appropriate audio field identifier is associated with each audio segment. The audio delimiters being entered by the user using touch tone (DTMF) keys has the great advantage that the DTMF tones themselves can be used to distinguish between and characterise the audio segments.

In embodiments where the audio segments are single or multiple DTMF tones, the audio delimiters must be distinguishable from the audio segments made up of DTMF tones, for instance by being a DTMF tone of a predetermined type such as that representing a # sign or by being a recognisable audio feature of another type. Similarly a predetermined DTMF tone can be used as an indication of the end of a complete transmission.

Furthermore, the user may use automatic means, such as a bar-code reader, to generate appropriate DTMF sequences for the audio delimiters.

The invention is not limited to the audio delimiters all being of the same type, rather a mixture of delimiter types may be used according to the particular audio segments being delimited. For example, in the same recorded audio signal, two consecutive audio segments may be delimited by a short period of silence whilst two consecutive DTMF audio segments may be delimited by a DTMF tone of a predetermined type.

The use of DTMF tones as audio delimiters and to characterise the audio segments has the further advantage that it is not necessary for the caller to fill in all the fields of the form because fields for which the corresponding DTMF code does not occur in the recorded message can be assumed to be left blank. Moreover, in this embodiment it is not necessary that the caller be specifically prompted for each input field, rather a caller may already know the format of the audio form they are filling in and which DTMF tone identifies which field. Thus, in many circumstances, the length of the dialogue with the apparatus can be greatly shortened.

The use of DTMF tones in the audio segments has the advantage that these can be recognised in real time by the recording means and thus can be used to determine branch points in a dialog prompting the caller's input. In such an embodiment, the DTMF tone audio segments can then also be used to identify subsequent audio segments, the form having effectively a tree structure.

The mixture of coded and non-coded audio interaction enables a more natural and efficient human-machine interaction and a more efficient subsequent processing of the recorded messages.

In a preferred embodiment in which the scanning means has a programmable component, the apparatus comprises a audio form compiler responsive to a formal description of the set of predefined identifiers to generate program code for controlling the programmable component to generate the data structure in accordance with the set of predefined identifiers.

In an embodiment in which the audio signal receiving and recording means also has a programmable component, the formal description of the identifiers can comprise structural information defining one or more predefined paths through the set of identifiers and the audio form compiler can be responsive to the structural information to generate program code for controlling the audio signal receiving and recording means to prompt a caller to supply information in accordance with the predefined paths though the set of identifiers.

In another aspect the invention provides a method for operating audio data processing apparatus to collect information from a caller over a telephone network, the method comprising the steps of receiving over the network from the caller and recording an audio signal comprising a sequence of audio segments separated by audio delimiters; and subsequently generating a data structure by scanning the recorded signal to detect the audio delimiters in which data structure a set of predefined field identifiers are each linked to a corresponding one of the recorded audio segments.

The method can comprise transcribe selected ones of the audio segments, the results of such transcription being used to prioritize subsequent processing of the recorded signal.

BRIEF DESCRIPTION OF THE DRAWINGS

Embodiments of the invention will now be described, by way of example only, with reference to the accompanying drawing, wherein.

DESCRIPTION OF THE PREFERRED EMBODIMENT

Figure 1:
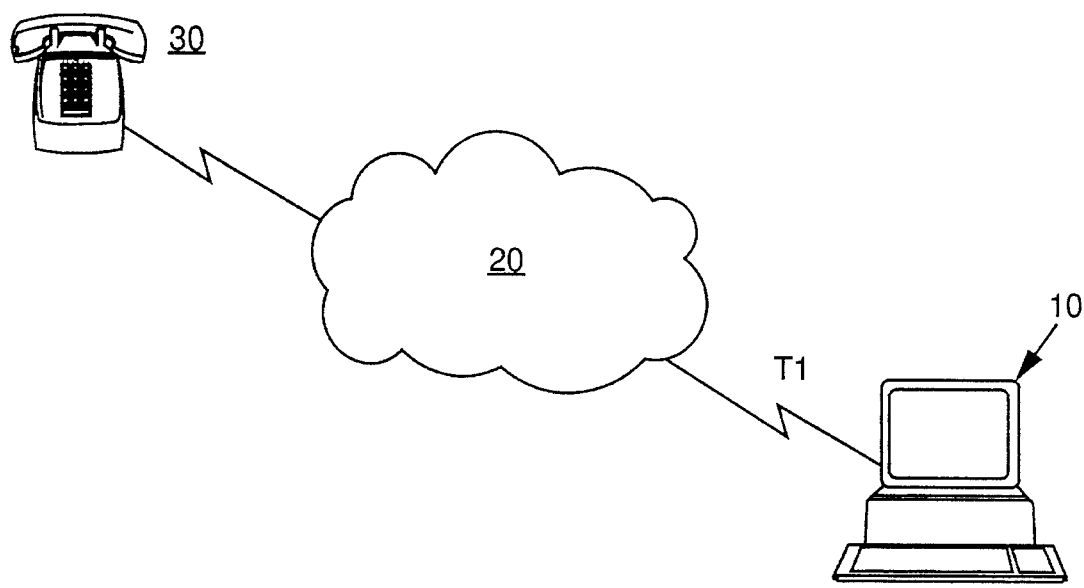
FIG. 1 is a schematic diagram showing the connection of audio processing apparatus to a telephone network.

Referring to FIG. 1, audio data processing apparatus 10 is connected via a digital trunk connection to a telephone network 20. A user can connect to the audio data processing apparatus using telephone 30 on one of a plurality of channels.

In this embodiment the audio data processing apparatus is in the form of a suitably programmed general purpose computer, which is connected to the telephone network via a suitable hardware adaptor. The computer can be, for example, one of the IBM RISC System/6000 family of computers on which the IBM DirecTalk/6000 software is running in conjunction with IBM AIX operating system software. The IBM DirecTalk/6000 software runs and manages audio processing applications and enables the computer to answer or initiate telephone calls, access databases to retrieve and store information or play voice responses to provide information over the network to users.

It will be understood that the invention could equally be embodied in dedicated hardware or in any suitable combination of hardware and software.

Figure 2:
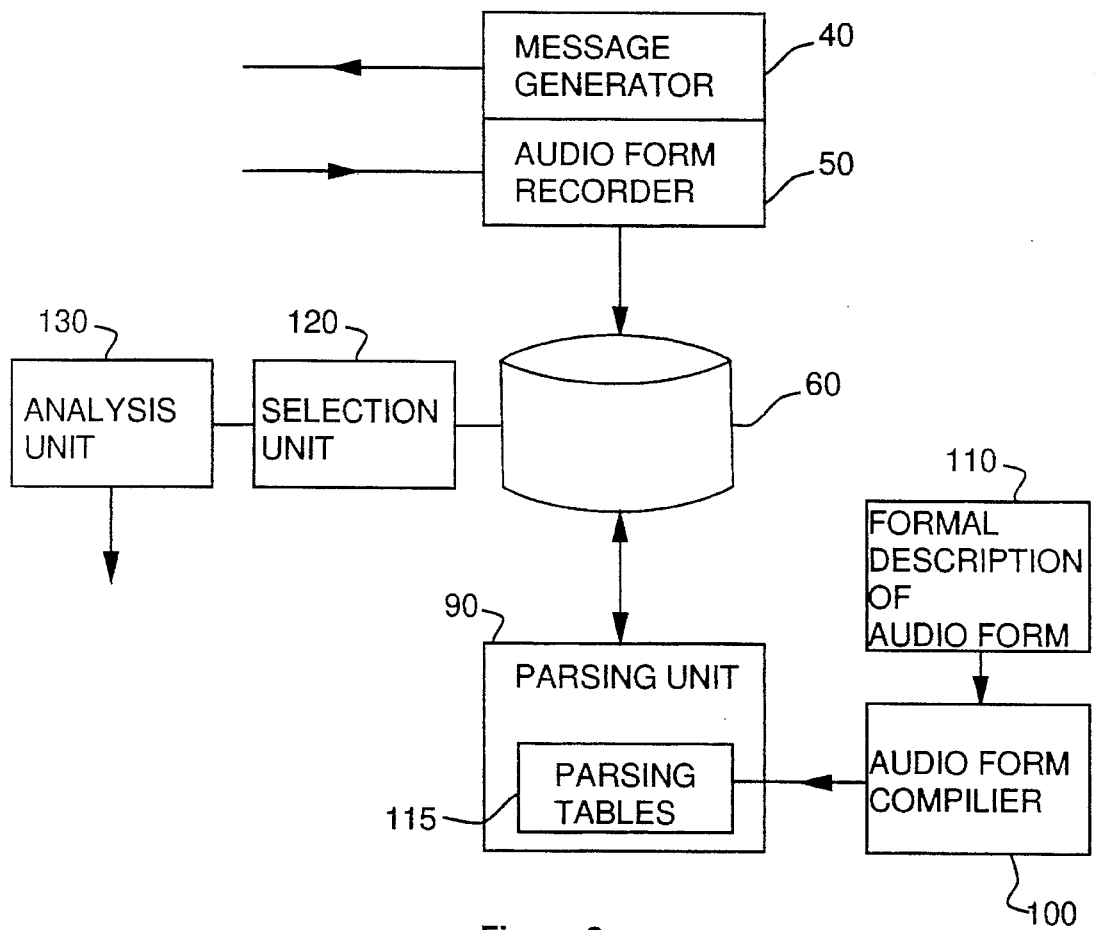
FIG. 2 is a schematic diagram showing audio processing apparatus of the embodiments.

FIG. 2 is a schematic diagram showing the software elements which are implemented in audio data processing apparatus 10. Message generator 40 generates audio messages which are played to the user when an incoming call is answered by the apparatus. Audio form recorder 50 is used to capture the audio signal input by the user and store the signal in digital form in storage device 60. The audio signal 65 input by the user has the structure shown in FIG. 3. It is an interleaved sequence of audio segments 70 and audio delimiters 80.

Each audio segment 70 in audio signal 65 corresponds to one field of an audio form.

Figure 4:
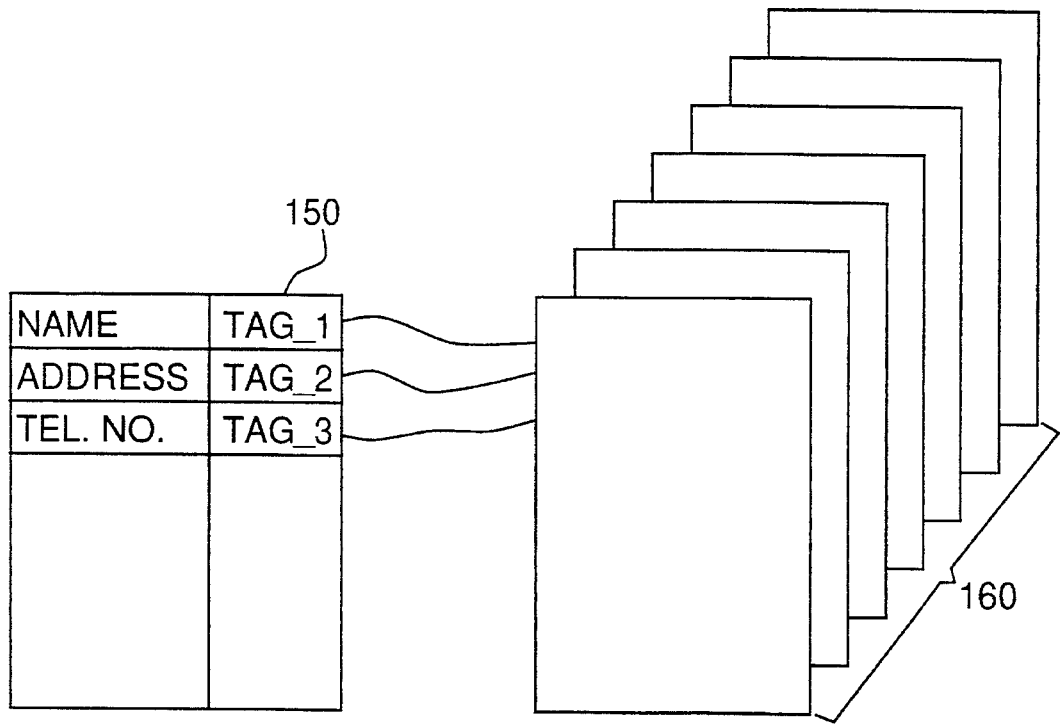
FIG. 4 is a schematic diagram showing the post processed audio form.

Once the audio signal 65 has been captured and stored, it is processed by parsing unit 90. This unit parses the stored signal according to a predefined form outline and generates a set of records each containing one of the audio elements 70 and a tagged index file 150. This structure is shown in FIG. 4 and is stored in storage device 60. The parsing unit detects the presence of the delimiters in the audio signal 65 and is able to allocate an appropriate index in the index file accordingly.

Audio form compiler 100 takes as input a formal description 110 of the audio form and translates this formal description to generate appropriate program code which implements the parsing unit 90. In this way a user of the system is able to program a desired form outline into the system. The parsing unit 90 is a general purpose such unit which is customised to this application by way of parsing tables 115 generated by the compiler 100.

Selection unit 120 accepts the data generated by the parsing unit 90 and performs programmed selection of certain fields of it according to a predefined template. This results in a output stream that contains a desired subset of the input stream. This selection is achieved by editing the index file 150.

Analysis unit 130 accepts the output stream of the selection unit and performs an analysis of its content. This analysis can include a transcription of the content of each selected voice segment, either manually via an operator or using automatic speech recognition; quality enhancement e.g. by filtering out noise; and sorting of fields by tag, priority or other given criteria.

Figure 5:
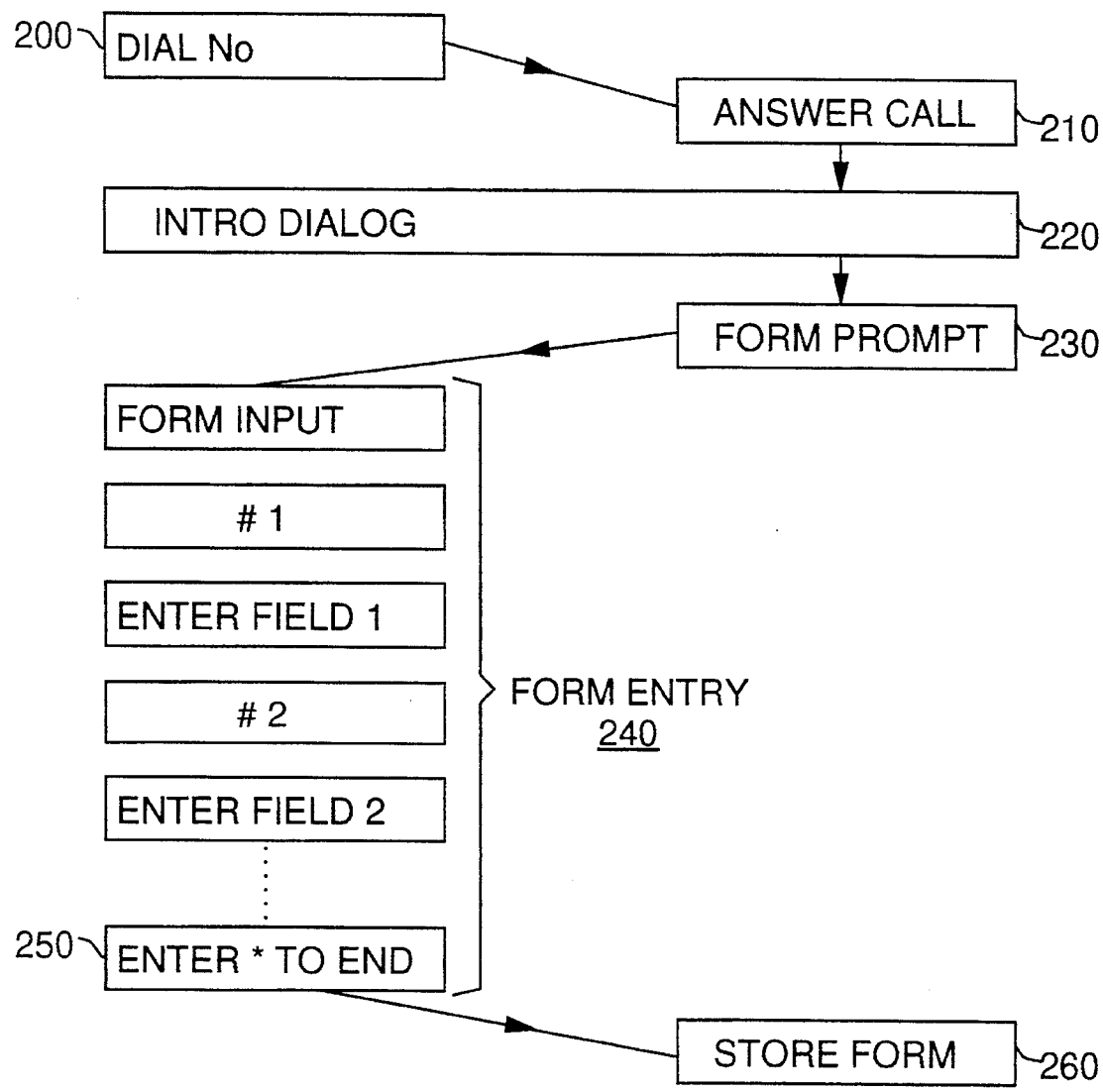
FIG. 5 shows an example dialogue in a first embodiment of the invention.

FIG. 5 shows an example of the sequence of events which occurs when a user calls the audio data processing apparatus of a first embodiment of the invention. User dials the number 200. The call is answered by the apparatus 210. There then follows a short dialogue 230 in which the user give information identifying the form they wish to fill in. This dialogue is entirely optional and may, for example, be omitted if the telephone number is dedicated to particular type of form. In this example, the dialogue is terminated by a prompt 230 for entry of the audio form.

At this stage the apparatus is in a mode in which the DTMF tones representing 0–9 are recorded with the speech input, but a * DTMF tone terminates input of the form.

Figure 3:
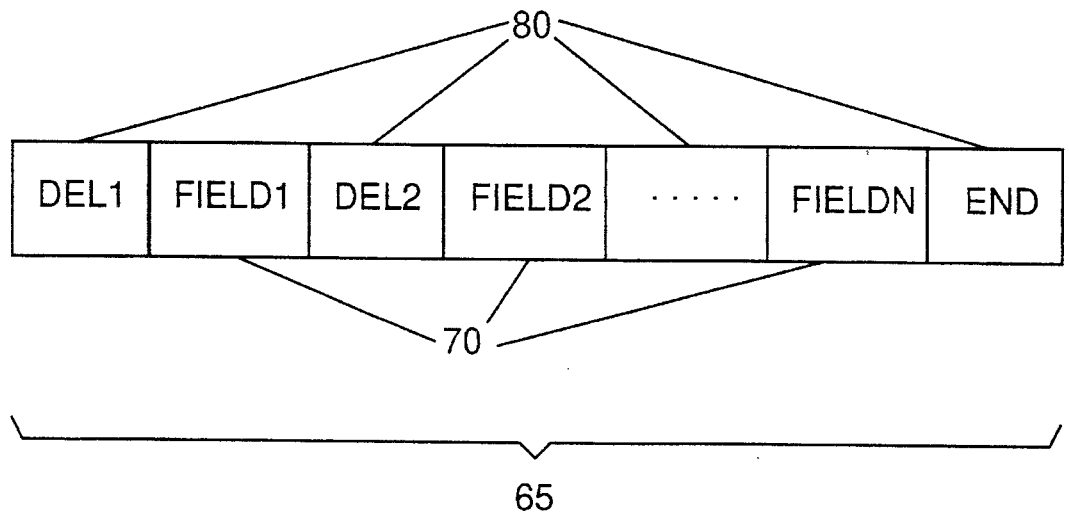
FIG. 3 is a schematic diagram showing an audio form.

The user then enters 240 orally speech information corresponding to fields of a form separated by DTMF tones, entered using the push buttons on the telephone, which identify the fields of the form for which the information which follows is intended. In this example key 1 corresponds to field 1 which may be the caller's name, key 2 corresponds to field 2 which may be the caller's address and so on. The entry of the form information is terminated 250 by entry of the * key. The entire form entered by the caller is then stored 260 for subsequent processing in the form of a single audio record 65 including the speech information and the DTMF tones, as illustrated in FIG. 3.

Figure 6:
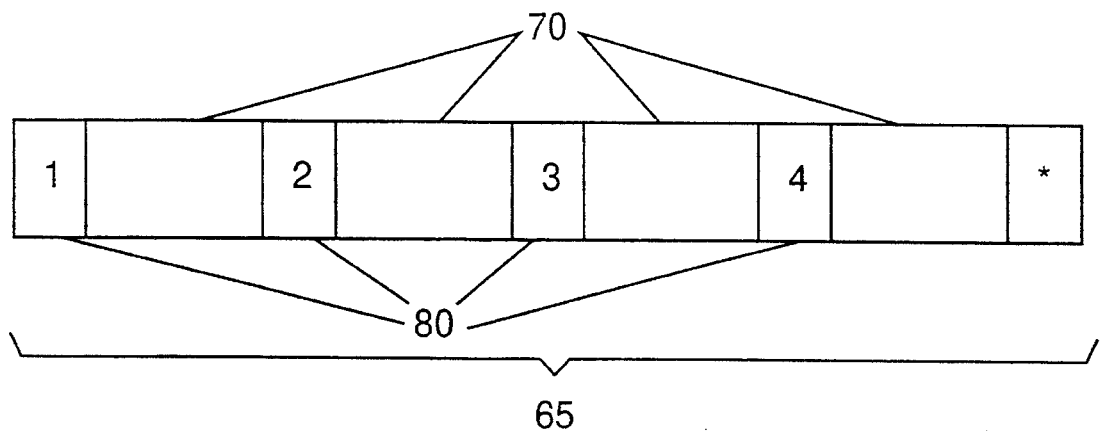
FIG. 6 shows the structure of the recorded audio signal in a first embodiment of the invention.

Thus, in this embodiment each audio segment is delimited by single or multiple DTMF tones and is identified by the DTMF tone or sequence of tones which precedes it. This structure is shown in FIG. 6.

In this embodiment the fields of the form may be entered in any order. So the user can, for example, fill in the easy parts of the form first, leaving more complicated matters until later. In another embodiment where the audio delimiters are periods of silence between pieces of information given by the user, then it is necessary that some other criterion, such as the order in which the information is given be used to identify the fields.

It is not necessary for the caller to fill in all the fields of the form because fields for which the corresponding DTMF code does not occur in the recorded message can be assumed to be left blank or to take a corresponding default value.

The following is a piece of pseudo code which illustrates the operation of the form recorder 50 in accordance with FIG. 5.

```
DCL     FORM : Audio;
        FORM_NUMBER : Integer;
BEGIN;
        STATE_0:   PLAY 'Enter Form Number'
                   GET_DATA (FORM_NUMBER)
        STATE_1:   PLAY 'Enter Form'
                   GET_FIELD (FORM)
END;
```

The function GET_FIELD () is provided by way of run-time support and retrieves and digitises input from the caller across the digital trunk connection, recording the DTMF tones 0–9 with the digitised speech data. FORM is a variable of data-type audio containing the recorded audio signal. The variable FORM is subsequently processed as an off-line job.

The Parsing unit 90 is exemplified in this embodiment by the following pseudo-code.

```
DCL     FIELD : VOICE ARRAY(3)
BEGIN;
        STATE_0 :  DO i = 1, 3
                       FIELD(i) := DECODE (FORM, i);
END;
```

The function DECODE is provided by way of run-time support to scan the variable FORM to detect DTMF code i and place the subsequent audio segment in variable FIELD_i.

Figure 7:
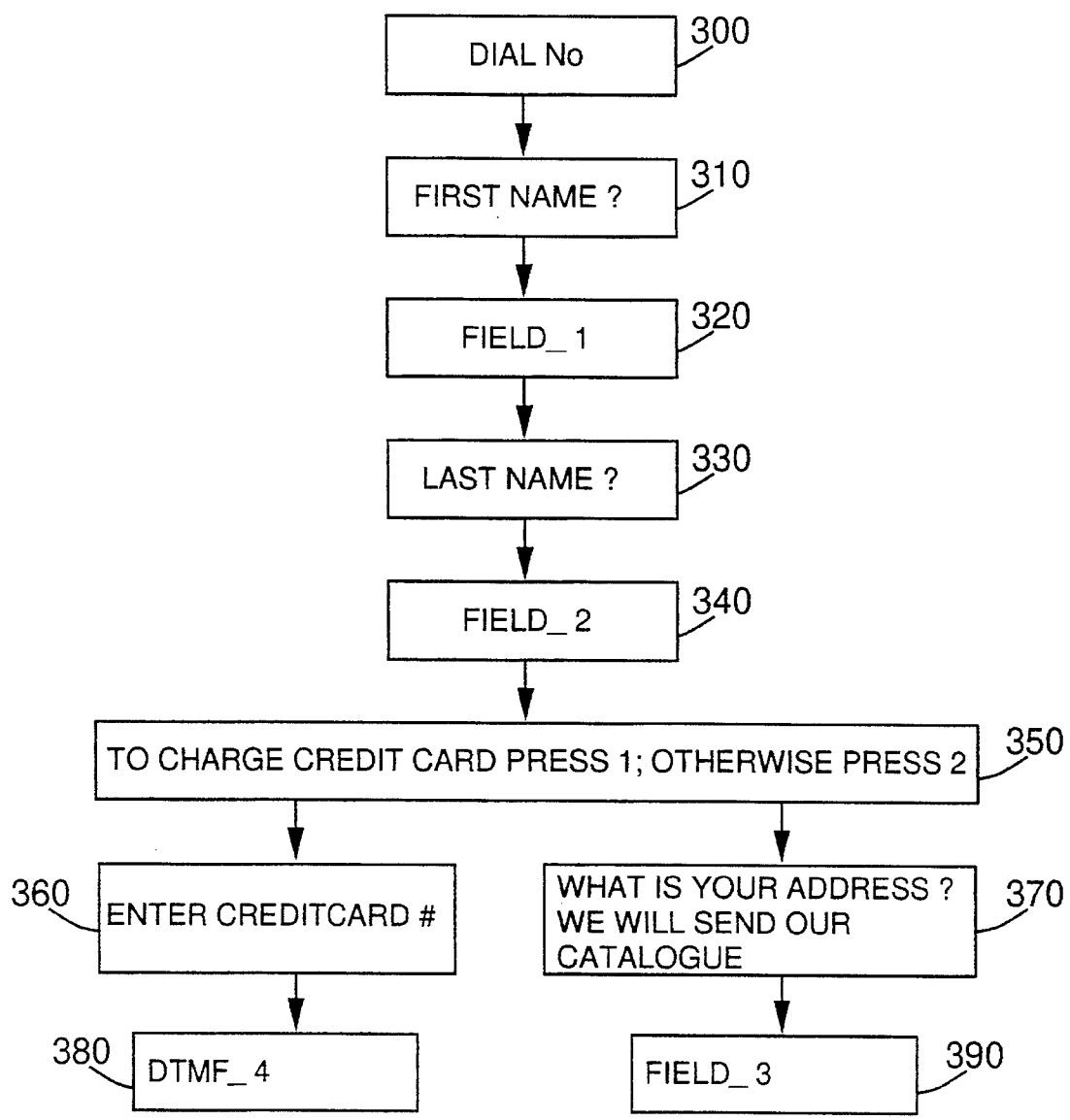
FIG. 7 shows an example dialogue in a second embodiment of the invention.

FIG. 7. shows an example of the sequence of events which occurs in a second embodiment of the invention, in which a conventional dialog is used to build an audio form. A user dials the number at step 300. The apparatus answers the call and immediately prompts the user for their name in steps 310, 320, 330, 340. Then the user is prompted to select whether they wish to charge a credit card. This selection is made by the user entering an appropriate DTMF code, in this case by pressing either button 1 or 2.

Message generator 40 either executes steps 360 and 380 to allow the caller to enter their credit card number or, if they have elected not to charge a credit card prompts the user for their address in steps 370 and 390.

Figure 8:
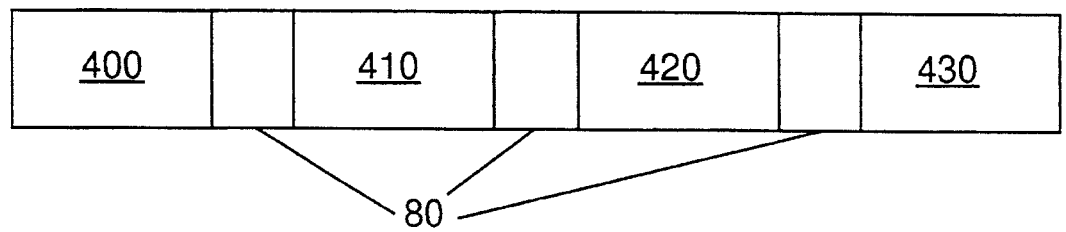
FIG. 8 shows the structure of the recorded audio signal in a second embodiment of the invention.

In this second embodiment the recorded audio signal has the structure illustrated in FIG. 8. It comprises audio segments 400, 410, 420, 430, separated by audio delimiters 80 which in this case are the DTMF tone representing the # sign.

Audio segment 400 contains voice field 1 entered at step 320. Audio segment 410 contains voice field 2 entered at step 340. Audio segment 420 contains the DTMF tone entered at step 350. The contents of audio segment 430 depends on the contents of segment 420. If segment 420 contains the DTMF tone corresponding to '1' then segment 430 contains the caller's credit card number either as a sequence of DTMF tones entered by the user, or as a recorded voice segment. If segment 420 contains the DTMF tone corresponding to '2' then segment 430 contains the callers address as a recorded voice segment.

The following pseudo-code shows the operation of the message generator 40 and form recorder 50 in this second embodiment of the invention.

```
DCL     FORM : Audio;
        CHOICE : DTMF(1);
        DELIM : DTMF(1);
BEGIN;
        FORM := ' ';
        DELIM:= DTMF_#;
        STATE_0:   PLAY 'Provide First Name';
                   APPEND(FORM, DELIM);
                   GET_FIELD (FORM);
                   GOTO STATE_1;
        STATE_1:   PLAY 'Provide Last Name';
                   APPEND(FORM, DELIM);
                   GET_FIELD (FORM);
                   GOTO STATE_2;
        STATE_2:   PLAY 'To charge a credit card press 1,
                          otherwise press 2';
                   GET_DATA (CHOICE);
                   APPEND(FORM, DELIM);
                   APPEND(FORM, CHOICE);
                   GET_FIELD (FORM);
                   IF CHOICE = DTMF_1
                   THEN GO TO STATE_3;
                   ELSE GO TO STATE_4;
        STATE_3    PLAY 'Enter your credit card number';
                   APPEND(FORM, DELIM);
                   GET_FIELD (FORM);
                   EXIT;
        STATE_4    PLAY 'What is your address,
                          we will send you our
                          catalogue';
                   APPEND(FORM, DELIM);
                   GET_FIELD (FORM);
                   EXIT;
END;
```

The function APPEND (FORM, DELIM) simply appends the delimiter DELIM to variable FORM.

The following pseudo-code shows the operation of the parsing unit 90 in this second embodiment of the invention.

```
DCL     FIRST_NAME : Voice
        LAST_NAME : Voice
        CHOICE: Boolean
        CREDIT_CARD_NO : audio
        ADDRESS : Voice
BEGIN;
        STATE_0:    FIRST_NAME :=
                    DECODE(FORM, #, 1);
                    LAST_NAME :=
                    DECODE(FORM, #, 2);
                    GOTO STATE_1;
        STATE_1:    IF DECODE(FORM, #, 3) = DTMF_1
                    THEN;
                        CHOICE := 1;
                        GO TO STATE_2;
                    ELSE DO;
                        CHOICE := 2;
                        GO TO STATE_3;
        STATE_2     CREDIT_CARD_NO :=
                    DECODE(FORM, #, 4);
                    EXIT;
        STATE_3     ADDRESS := DECODE(FORM, #, 4);
                    EXIT;
END;
```

In this case the function DECODE has a third parameter which tells it which occurrence of the delimiter to detect. For example DECODE(FORM, #, 4) returns the contents of the audio segment in variable FORM immediately following the fourth occurrence of the DTMF code representing the # sign.

In this embodiment the formal description of the audio form has two components: the list of individual fields, some of which may be arrays of fields e.g. in cases where there is some repeated information such as names of family members for which a hotel reservation is made; and structural information, e.g. a tree structure in which each path defines one specific form sub-layout, a directed acyclic graph in which each path defines one specific sub-layout and two different sub-layouts may have some fields in common, or even an arbitrary graph which may contain cycles in cases in which the interaction with the user involves arrays of fields.

We claim:

1. Audio data processing apparatus connectable to a telephone network (20), the apparatus comprising:

means (50) to receive from the network and record an audio signal (65) comprising a sequence of audio segments (70) separated by audio delimiters (80);

means (90) for scanning the recorded signal (65) to detect the audio delimiters (80) and generate a data structure (150, 160) comprising a set of audio records (160), each such record containing one of the audio segments (70), and an index file comprising a set of predefined field identifiers each having an associated pointer to a corresponding one of the audio records (160).

2. Apparatus as claimed in claim 1 comprising means for editing the index file wherein ones of the recorded audio segments can be selectively processed.

3. Apparatus as claimed in any preceding claim in which the scanning means (90) has a programmable component, the apparatus further comprising a compiler (100) responsive to a formal description of the set of predefined field identifiers to generate program code for controlling the programmable component to generate the data structure in accordance with the set of predefined field identifiers.

4. Apparatus as claimed in claim 3 wherein the audio signal receiving and recording means has a programmable component and wherein the formal description of the set of predefined field identifiers comprise structural information defining one of more predefined paths through the set of predefined identifiers, the compiler (100) being responsive to the structural information to generate program code for controlling the audio signal receiving and recording means to prompt a caller to supply information in accordance with the predefined paths through the set of predefined field identifiers.

5. Apparatus as claimed in claim 1 wherein at least some of the audio delimiters (80) are DTMF tones.

6. Apparatus as claimed in claim 1 wherein the audio delimiters (80) are DTMF tones each of which identify an associated audio segment.

7. Apparatus as claimed in claim 1 wherein at least some of the audio segments comprise DTMF tones.

8. Method for operating audio data processing apparatus to collect information from a caller over a telephone network, the method comprising the steps of receiving over the network from the caller and recording an audio signal (65) comprising a sequence of audio segments (70) separated by audio delimiters (80); and subsequently generating a data structure (150, 160) by scanning the recorded signal (65) to detect the audio delimiters (80) and generating the data structure having a set of predefined field identifiers with each linked to a corresponding one of the recorded audio segments (160); and transcribing selected ones of the audio segments, the results of such transcription being used to prioritize subsequent processing of the recorded signal (65).

9. A method for operating an audio data processing apparatus to collect information from callers over a telephone network, said method comprising the steps of:

receiving, over the telephone network, information from a caller;

recording audio signals representative of the information, said audio signals including a sequence of audio segments separated by audio delimiters;

scanning the audio signals to detect the audio delimiters; and generating a data structure comprising a set of audio records with each audio record containing one of the audio segments and an index file comprising a set of tags each having an associated pointer to a corresponding one of the audio records.

10. A method for operating an audio data processing apparatus to collect information from callers over a telephone network, said method comprising the steps of:

receiving over the telephone network information from a caller;

recording audio signals representative of the information, said audio signals including a sequence of audio segments separated by audio delimiters;

scanning the audio signals to detect the audio delimiters; and using the audio delimiters to generate a data structure comprising audio records with each one containing at least one audio segment and an index file containing identifiers with each identifier being linked to a selected audio segment in the audio records.

* * * * *